UNITED STATES PATENT OFFICE 2,669,008

METHOD OF MANUFACTURING TUNGSTEN ARTICLES OF PREDETERMINED SHAPE AND DIMENSIONS

Roberto Levi, New York, N. Y., assignor to Philips Laboratories, Inc., Irvington-on-Hudson, N. Y.

No Drawing. Application June 30, 1951, Serial No. 234,672

2 Claims. (Cl. 29—148)

My invention relates to the manufacture of tungsten articles of predetermined shape and dimensions.

Because of the extreme hardness of tungsten metal, it has been considered impracticable, if not impossible to machine a body of tungsten metal into an article of desired shape and dimensions. However, tungsten having the highest melting point of any metal and being capable of withstanding high temperatures without deformation could have a widespread use if it were feasible to readily work the tungsten into a desired shape. Consequently, where an article having desired shape and dimensions and capable of withstanding relatively high temperatures while maintaining a high hot strength is required, molybdenum has been used although molybdenum does not withstand high temperatures as well as tungsten.

Accordingly, it is an object of my invention to provide a method for machining tungsten into an article of desired shape and dimensions.

Other objects and advantages of my invention will appear as the specification progresses.

According to my invention a relatively coarse tungsten powder is formed into a body under pressure and sintered at relatively high temperatures to form a body of tungsten having the required degree of mechanical strength. This body differs from a body of solid tungsten in that it is not as dense as the latter and has a myriad of pores which can be filled with a filler metal for a purpose to be hereinafter described.

The sintered body is then impregnated with a filler metal which has a melting point lower than the sintering temperature and which does not alloy with tungsten in the metallographic sense. After impregnation with the filler metal, the tungsten body can be readily machined by turning it down on a lathe, drilling, boring, threading, tapping or any other machine tool operation.

Finally, in order to free the tungsten body of the filler metal, the body is heated to a temperature below the sintering temperature and at a temperature at which the filler metal volatilizes for a time sufficient to evaporate all of the filler metal from the tungsten body thus leaving a pure tungsten body of desired shape and dimensions.

The sintering temperature preferably should be chosen as high as possible since the tungsten body will be able to withstand shrinkage and warpage only up to the sintering temperature. However, it is desirable to avoid sintering the body to such an extent that the body becomes so dense that the filler metal cannot penetrate the pores of the body.

The choice of sintering temperature will depend upon the pressure used in forming the body and the particle size of the tungsten powder. It is preferable, therefore, to use a relatively coarse tungsten powder and low shaping pressures to form the body and sinter at very high temperatures, e. g. up to 2800° C. However, finer tungsten powders can be used with lower shaping pressures and lower sintering temperatures.

Of course, if the article need not withstand the very high temperatures which tungsten itself is capable of withstanding without melting, sintering can be effected at temperatures as low as 1000° C. in which case higher shaping pressures and finer particle size tungsten powder should be employed.

Sintering is effected in a non-oxidizing and preferably partially or completely reducing atmosphere to prevent oxidation of the tungsten, e. g., a hydrogen-nitrogen mixture.

From the above it will be seen that the type of sintered tungsten bodies with which the invention is concerned cannot be clearly defined by particle size, forming pressure, heating temperature and time of heating, since these factors can be varied over rather wide limits while still obtaining a sintered tungsten body of the type with which the method of the present invention makes satisfactory machining possible. In the claims I have referred to such a body as "unmachinable sintered porous body" and by this term I mean a body of porous sintered tungsten in which the particle size, forming pressure, and degree and time of heating are so selected and co-related that the resulting body has such a degree of porosity and coherency that satisfactory machining with the usual cutting operations, such as drilling or turning on a lathe, is extremely difficult or impossible.

The filler metal must not alloy with tungsten in a metallographic sense and must melt at a temperature below the sintering temperature. It should also be inert to a non-oxidizing and preferably a partly or completely reducing atmosphere such as hydrogen and should have a relatively high vapor pressure in a vacuum at temperatures below the sintering temperature. The filler metal should preferably have lubricating properties. I have found that copper, gold, silver and alloys of these metals in any combination are very satisfactory for this purpose.

The sintered body is preferably impregnated by placing it in contact with molten filler metal under a non-oxidizing and preferably a completely reducing atmosphere and allowing the metal to penetrate into the pores of the body by capillary attraction.

The invention will be described in greater detail by means of the following example which is illustrative of my invention. I have chosen this example to illustrate the advantages of my invention as applied to a tungsten body which ordinarily could not be machined or shaped. The limitations regarding sintering temperatures, pressure and particle size are to be considered illustrative only for as pointed out above, these factors can be varied considerably and should be chosen for each individual case.

Tungsten powder having a density of 54 gms./in.$^3$ and comprising the following fractions in the following proportions as determined by the elutriation test:

| Fraction | Radius | Proportion by Weight |
|---|---|---|
| | | Percent |
| I | Over 6.1μ | 30.9 |
| II | Between 6.1–3.6μ | 30.6 |
| III | Between 3.6–2.9μ | 13.3 |
| IV | Between 2.9–2.2μ | 7.6 |
| V | Between 2.2–1.5μ | 17.6 | was formed into a bar-shaped body under a pressure of 2,000 kg./cm.$^2$ and pre-sintered at 1100° C. for 20 minutes in hydrogen so that the body had some mechanical strength. The pre-sintered body was then heated in a hydrogen atmosphere by conduction in a suitable furnace by attaching electrodes to the ends of the bar and passing current therethrough to raise its temperature to 2150° C. (optical temperature) for about 20 minutes. The ends of the bar which were not fully sintered because they had not reached the required temperature were broken off and discarded. The sintered bar had a density of 16 gms./cm.$^3$ which corresponded to 83% of the theoretical density of tungsten.

The bar was impregnated by placing it in contact with molten copper under an atmosphere of hydrogen at a temperature of 1350° C. and the bar allowed to absorb the copper by capillary attraction. About 7% by weight of copper was absorbed by this process.

The impregnated body was turned on a lathe in a conventional manner into a cylindrical rod of given diameter. A portion of the rod was further turned on the lathe to a reduced diameter and the latter portion then threaded with a die. The portion of larger diameter formed the head of the screw and a slot was milled into the head.

Finally, the impregnated tungsten screw was heated to a temperature of about 1550° C. in a vacuum for 20 minutes during which time the copper was completely evaporated out of the body leaving a pure tungsten screw.

Obviously wherever parts are expected to withstand high temperatures without deformation, my invention will be applicable to the making of tungsten parts for this purpose. For example, the method makes possible the manufacture of planar, convex, or concave cathodes for electron discharge tubes where dimensional limitations and tolerances are very exacting, heat-resistant hardware, focusing cups for X-ray tubes, seamless tungsten tubing, and other applications. If the porosity of the finished article is objectionable, it is only necessary to burnish the article after the filler metal has been evaporated therefrom and a non-porous surface is obtained.

While I have thus described my invention with specific examples and applications, other modifications thereof will be readily apparent to those skilled in the art without departing from the spirit and scope of my invention as defined in the appended claims.

What I claim is:

1. A method of manufacturing a machined tungsten body of desired shape and dimensions with the use of a filler metal selected from the group consisting of copper, gold, silver and alloys between those metals in any proportions comprising the steps of pressing a mass of tungsten particles into a body, heating the pressed tungsten body at a sintering temperature higher than 1000° C. and substantially higher than the temperature at which said filler metal is subsequently evaporated to thereby form an unmachinable sintered porous body, impregnating the porous body with the molten filler metal, the tungsten portion of said body being substantially in its final sintered state, machining the impregnated body to remove portions therefrom and obtain the body of desired shape and dimensions, and evaporating said filler metal from said body in a substantially non-oxidizing atmosphere and at a temperature substantially less than said sintering temperature without appreciably changing the dimensions thereof.

2. A method of manufacturing a machined tungsten body of desired shape and dimensions comprising the steps of pressing a mass of tungsten particles into a body, heating the pressed tungsten body at a temperature of about 2150° C. to thereby form an unmachinable sintered porous body having a density of about 83% of theoretical density, impregnating the porous body in hydrogen with molten copper, the tungsten portion of said body being substantially in its final sintered state, machining the impregnated body to remove portions therefrom and obtain the body of desired shape and dimensions, and heating the impregnated body in a vacuum at a temperature of about 1550° C. to remove the copper without appreciably changing the dimensions of the machined body.

ROBERTO LEVI.

References Cited in the file of this patent

UNITED STATES PATENTS

| Number | Name | Date |
|---|---|---|
| 1,026,343 | Coolidge | May 14, 1912 |
| 1,026,429 | Coolidge | May 14, 1912 |
| 1,034,949 | Arsem | Aug. 6, 1912 |
| 1,757,846 | Schroter | May 6, 1930 |
| 1,896,606 | Bates | Feb. 7, 1933 |
| 2,096,924 | Schwarzkopf | Oct. 26, 1937 |
| 2,239,144 | Dean et al. | Apr. 22, 1941 |
| 2,275,420 | Clark | Mar. 10, 1942 |
| 2,390,183 | Seligman | Dec. 4, 1945 |
| 2,393,323 | Hungerford | Jan. 22, 1946 |
| 2,401,221 | Bourne | May 28, 1946 |
| 2,462,045 | Wulff | Feb. 15, 1949 |
| 2,549,939 | Shaw | Apr. 24, 1951 |